(12) United States Patent
Strekal et al.

(10) Patent No.: US 12,303,858 B2
(45) Date of Patent: May 20, 2025

(54) VESSEL SUPPORT SYSTEM

(71) Applicant: RES POLYFLOW LLC, San Francisco, CA (US)

(72) Inventors: George W. Strekal, Conneat, OH (US); Jay Schabel, Hiram, OH (US); Richard A. Schwarz, Akron, OH (US); Mehmet A. Gencer, Brecksville, OH (US)

(73) Assignee: RES POLYFLOW LLC, San Francisco, CA (US)

( * ) Notice: Subject to any disclaimer, the term of this patent is extended or adjusted under 35 U.S.C. 154(b) by 853 days.

(21) Appl. No.: 17/411,794

(22) Filed: Aug. 25, 2021

(65) Prior Publication Data

US 2022/0063966 A1 Mar. 3, 2022

Related U.S. Application Data

(60) Provisional application No. 63/071,400, filed on Aug. 28, 2020.

(51) Int. Cl.
| | | |
|---|---|---|
| *C10B 7/12* | (2006.01) | |
| *B01J 6/00* | (2006.01) | |
| *B01J 19/00* | (2006.01) | |
| *B01J 19/20* | (2006.01) | |
| *C10B 45/00* | (2006.01) | |

(52) U.S. Cl.
CPC .............. *B01J 19/20* (2013.01); *B01J 6/008* (2013.01); *B01J 19/0053* (2013.01); *C10B 7/12* (2013.01); *C10B 45/00* (2013.01); *B01J 2219/187* (2013.01)

(58) Field of Classification Search
CPC ......... C10B 7/12; B01J 19/0053; B01J 19/20; B01J 6/008
See application file for complete search history.

(56) References Cited

U.S. PATENT DOCUMENTS

| | | | |
|---|---|---|---|
| 3,454,259 | A | 7/1969 | Faulkner |
| 4,106,641 | A | 8/1978 | Campbell et al. |
| 5,893,471 | A | 4/1999 | Zakula |
| 6,081,573 | A | 6/2000 | Akimoto et al. |

(Continued)

FOREIGN PATENT DOCUMENTS

| | | |
|---|---|---|
| CN | 106315384 A | 1/2017 |
| CN | 109665435 A | 4/2019 |

(Continued)

OTHER PUBLICATIONS

Office Action and Search Report by Japanese Patent Office for corresponding Japanese Application No. 2023135718 mailed Feb. 20, 2024.

(Continued)

*Primary Examiner* — Jonathan Miller
(74) *Attorney, Agent, or Firm* — Hudak, Shunk & Farine Co. LPA

(57) ABSTRACT

The support mechanisms of the present invention comprise a vessel supported by suspension cables suspended from trollies that can move along the length (longitudinal) of a framework. The support system is such that waste material, even upon heating, cooling, etc., can constantly and smoothly move through the entire system, with the vessel generally being in a natural, balanced orientation.

20 Claims, 2 Drawing Sheets

(56) References Cited

U.S. PATENT DOCUMENTS

| | | | | |
|---|---|---|---|---|
| 6,736,940 | B2* | 5/2004 | Masemore | C10G 1/10 |
| | | | | 201/3 |
| 7,329,329 | B2* | 2/2008 | Masemore | C10B 47/44 |
| | | | | 202/117 |
| 10,093,864 | B2* | 10/2018 | Tandon | C10G 1/002 |
| 2002/0119089 | A1* | 8/2002 | Masemore | C10G 1/10 |
| | | | | 202/99 |

FOREIGN PATENT DOCUMENTS

| | | |
|---|---|---|
| JP | S50-156161 A | 12/1975 |
| JP | S59-176175 A | 10/1984 |
| JP | S63-27391 A | 2/1988 |
| JP | 8-271670 A | 10/1996 |
| KR | 20180065244 A | 6/2018 |
| WO | 2011018920 A1 | 2/2011 |
| WO | 2017173006 A2 | 10/2017 |

OTHER PUBLICATIONS

Supplementary European Search Report dated Jul. 16, 2024 for corresponding European Application 21862707.3.

* cited by examiner

VESSEL SUPPORT SYSTEM

FIELD OF THE INVENTION

Plastic conversion vessels, including pyrolytic, are utilized to convert plastic waste material, such as polymers and/or carbonaceous materials, to other chemical compounds and/or gases that have desirable end uses. Such vessels serve to eliminate environmental problems such as undesirable trash on ground sites or in aqueous locations such as oceans and/or lakes, and the like. The suspended vessel of the present invention relates to a support system that comprises an overhead framework and a suspension system for the vessel. The lower end of the suspension cables are operatively connected as at alternating defined intervals to the sides of the vessel and the upper cable ends are attached to a trolley. The trollies comprise load sensors and a cable adjustment device that independently increases or reduces the load on an individual suspension cable and are manually or preferably automatically adjustable so that the stress or load on each interval of the vessel are desirably balanced or have similar loads so that the supported vessel has a near natural longitudinal shape or orientation. Accordingly, the amount of waste material fed to the vessel can be controlled and exist on a steady state basis whereby efficient conversion of the waste material to various gases and/or chemical compounds is conducted.

BACKGROUND OF THE INVENTION

Plastic conversion vessels, upon heating and having various chemical and physical reactions conducted therein, will inherently expand along the longitudinal length thereof and generally result in a deformed geometry of the vessel. For example, a highly heated region thereof will deform due to stress and temperature differences between the lower and upper surfaces of the vessel. This fact is undesirable in that it interrupts a desired constant or steady flow of waste material in the vessel that is transformed into chemicals, gases, and the like. In other words, the flow path of the waste material, instead of flowing at a constant generally horizontal or in a slightly upward direction, is interrupted such that the efficiency of the vessel is reduced and at times proper product output cannot be achieved. Contraction of the vessel as upon cooling will also produce vessel load or distortion problems. Such heat and stress differences can shorten the useful life of the vessel and potentially lead to failure.

SUMMARY OF THE INVENTION

The purpose of the present invention is to provide a smooth, even, and efficient transfer or flow of the waste material along the vessel bottom until it is converted to other materials or compounds. That is, the support system of the present invention is a dynamic operation whereby suspension cables serve to minimize stress along the length (i.e. longitudinally) of the vessel as well as to generally balance stress by increasing or decreasing suspension load at various contact points of the vessel.

In summary, the support mechanisms of the present invention comprise a vessel supported by suspension cables suspended from trollies that can move along the length (longitudinal) of a framework. The support system is such that the waste mass, even upon heating, cooling, etc., can constantly and smoothly move or flow through the entire system, with the vessel generally being in a natural, balanced shape.

In general, a support structure for selectively supporting a vessel, comprises: an overhead frame located above said vessel; a plurality of suspension cables; and one or more trolley devices attached to said overhead frame, said one or more trolley devices, independently, operatively, and movably securing said suspension cable to said overhead framework; at least some of said plurality of said suspension cables being operatively connected to said vessel at various longitudinal locations thereon; and said one or more trolley devices being capable of independently increasing or decreasing said tension on said individual cables.

A process for supporting a vessel from an overhead frame comprising adding a plurality of trolley devices independently to different longitudinal locations on said frame; a plurality of suspension cables, wherein each said suspension cable independently is connected to a different said trolley; operatively connecting said one or more suspension cables each, independently, to a different location on said vessel; and at least one cable adjustment device that increases or decreases the tension, on an individual suspension cable

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION OF THE INVENTION

Figure 1:
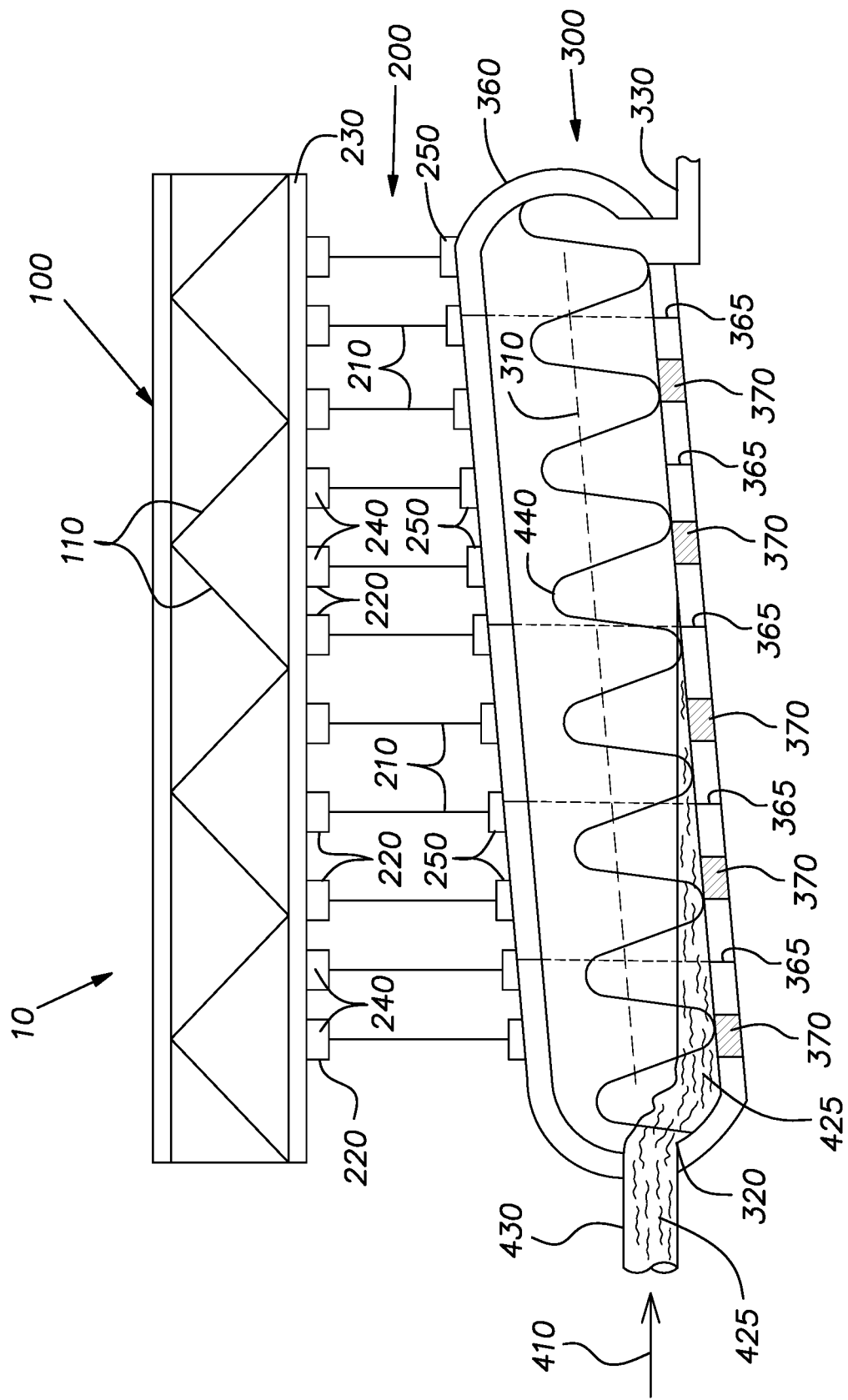
FIG. 1 is a schematic view of a suspension structure for supporting a vessel, via suspension cables, from an overhead frame.

The support structure 10 of the present invention generally comprises overhead framework 100 located above a plastic conversion vessel 300, and, a suspension system 200 having one or more, e.g. a plurality of suspension cables 210 for selectively supporting vessel 300. Framework 100 can be any conventional overhead framework such as conventional truss 110 that provides a strong, sturdy, overhead support in three dimensions. Truss 110 contains support rails 230 on which ride one or more trolleys 220 that have wheels 222 thereon. Rails 230 are connected to framework 100 in any conventional manner as by bolts, fasteners, or welding generally in a longitudinal direction, i.e. along the length of vessel 300. Suspension cables 210 are independently, i.e. at least some and preferably all cables are, connected to framework 110 by trolleys 220. Trolley wheels 222 ride along or on rails 230 so that the various suspension cables can be moved forward or backward, that is longitudinally along the length of reactor vessel 300. The trolley 220 contains a cable tension adjustment device 215 that manually, but preferably automatically, adjusts the tension of any individual cable 210 to generally provide means to compensate the tension on the various cables to balance distresses generally on all vessel connection points as well as minimize the stress on vessel 300. An example of a vessel connection point is lower cable fastener 212 that is fixed to vessel connection plate 250 in any conventional manner such as by welding, bolts, and the like. The cable tension adjustment device can comprise a commercial load reduction or increasing devices known to the art and to the literature. Examples of such tension devices include motorized rack and pinion devices, motorized gear reduction systems, hydraulic cylinders, air pressurized cylinders, motorized lift jacks, and the like.

Figure 2:
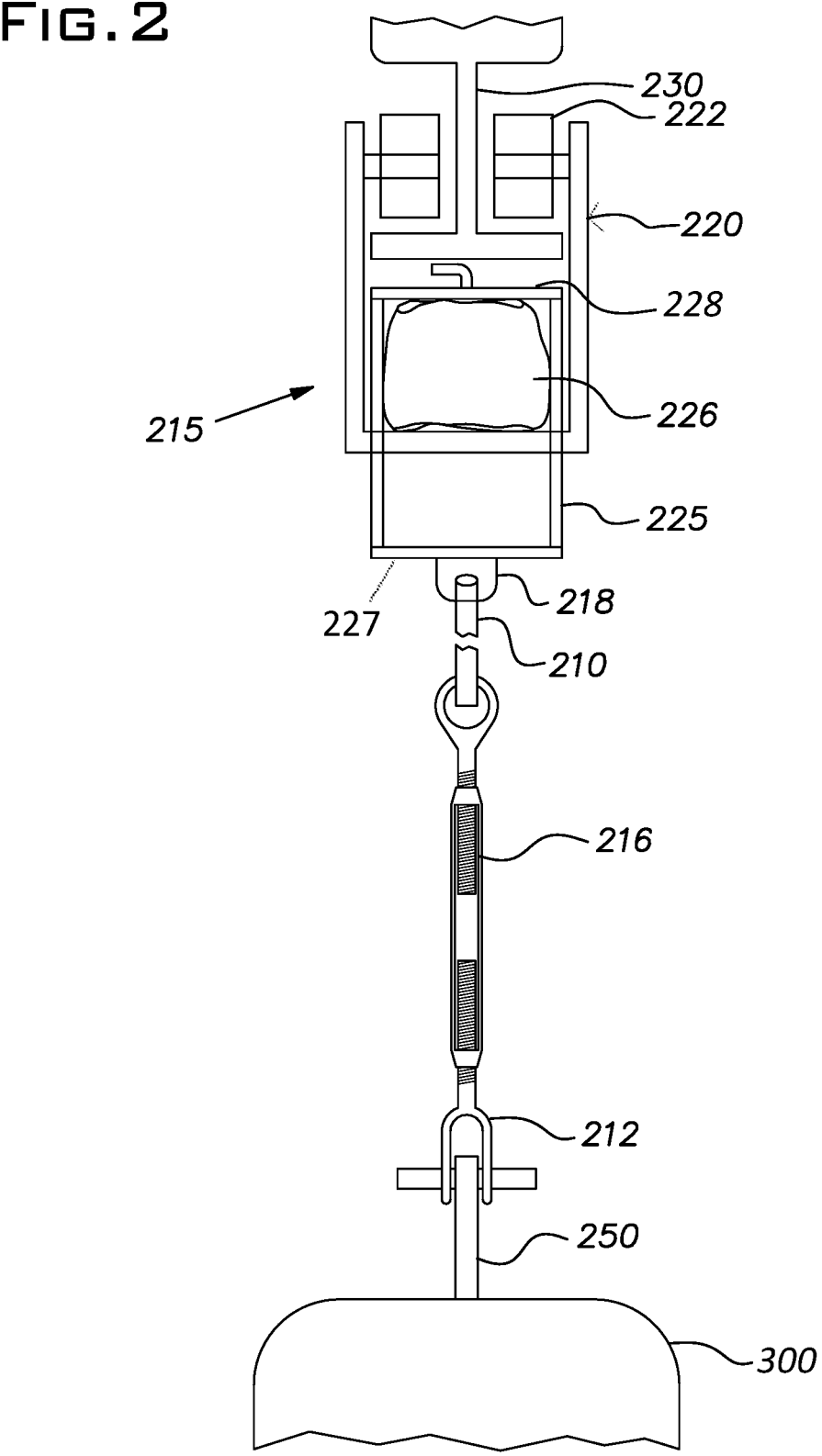
FIG. 2 is a schematic view of a trolley system containing a load cell or sensor, an airbag, and a suspension cable wherein the tension thereof can be automatically adjusted.

A preferred tension adjustment device 215 is an air bag assembly such as shown in FIG. 2 wherein the one or more trolleys 220 contain an internal lower box 225 that resides below rail 230. Air bag 226 resides within box 225 with the lower end 227 thereof that is connected to upper support 218 with box top end 228 residing within trolly 220. The air bag is impervious to air or other gas, e.g. nitrogen, and thus is made of a rubber, or a flexible material such as polypropylene. Air bag 226 is filled with a pressurized gas such as air that can generally range from about 10 to about 90 psig, desirably from about 15 to about 60 psig, and preferably from about 20 to about 40 psig, depending upon the weight of vessel 300 as well as suspension cable 210 and the various components thereof. Should the load on tension on cable 210 be considered to be low, the pressure in air bag 226 can be increased so that internal lower box 225 is raised and exerts additional tension on suspension cable 210. Conversely, should the load on cable 210 be considered to be too great, the air pressure therein can be reduced so that the tension on cable 210 is reduced. As noted throughout this specification, a desired aspect of a vessel support system is that generally loads on each cable are similar to the remaining cables to achieve a generally balanced load on all of the cables. That is, the various one or more trolleys, independently (i.e. at least some) and preferably all are capable of increasing or decreasing the tension on a cable.

As shown in FIG. 2, upper support 218 that can be a flange or tab attached to lower box 225 and is also attached to a monitoring load cell or sensor 240 that, can be located on said trolley, and desirably, automatically analyzes and monitors the pressure on an individual cable and sends a readout to a control device such as a computer. Thus, the pressure in any one or more individual air bags can be adjusted so that the tension on any one or more sensor load cells is similar to other load cells sensors on any of the remaining cables, as for example, in any given area, or for all said cables. This is accomplished by the computer (not shown), that can be located on framework 100 sending a signal to a particular air bag to increase or decrease the pressure therein to thereby raise or lower a portion of the vessel.

The initial tension on cable 210 between vessel 300 and air bag 226 can be adjusted through turn buckle 216 or other similar device. Moreover, the top end of suspension cable 210 can be attached to load cell or sensor 240 in any conventional manner as by welding, use of bolts and u-shaped clamps, or the like to secure the cable end to the load cell, and the like.

Cables 210 can be metallic rods, metallic tubes, and the like with a metallic cable, such as steel, made of several strands of flexible steel, being preferred. Flexible cables 210 are desired inasmuch as they provide longitudinal movement of vessel 300, as well as perpendicular movement thereof to (i.e. lateral or sideways) with respect to longitudinal axis 310, of vessel 300.

Uneven longitudinal and perpendicular (lateral) loads placed upon the individual cables can be caused by many items including uneven amounts of molten material located within vessel 300 along the longitudinal direction of vessel 300, uneven expansion of various portions of vessel 300 as due to different heat temperatures of various sections thereof, lateral stresses on vessel 300 as caused by strong winds, and the like.

Such longitudinal and lateral movements of vessel 300 are readily managed individually, operatively, and moveably by suspension system 200. Thus, the stress on vessel 300 at various locations thereof can be minimized, reduced, or abated, or alternatively, where needed, increased or amplified through trolley devices 220 and bags 226.

That is, trolley device 220 through air bags 226 and generally load cells 240 balance and/or minimize the load on any particular or plurality of cables and achieve a more balanced load distribution so the pendent vessel retains a reduced stress shape thereby reducing thermal and mechanical stress throughout the vessel and produces a more even flow of molten waste material in vessel 300.

As noted, the bottom or lower ends of at least some of the suspension cables 210, i.e. independently, and preferably all of said cables, are operatively connected to vessel 300 at specific, desirably equal, distances along alternating sides of the longitudinal length of vessel 300 in any conventional manner known to the art and to the literature. For example, a first connection plate can be attached to the left front side of the vessel, a second connection plate is attached to the right side of the vessel downstream (longitudinally) from the first connection plate, with the remaining connection plates being alternating connected to the vessel so that desirably no such plates are located directly opposite (laterally) to each other along the longitudinal length of the reactor. Such alternative connections serve to adjust for lateral deviations of the vessel.

As noted, a significant purpose of suspension system 200 of the present invention is to maintain a balanced support for vessel 300 as it changes shape upon heat-up thereof, as well as subsequent cool-down, i.e. termination of operation of the vessel, change in operating temperatures, and the like. Since the bottom of the vessel is heated more than the top portion, it "curves", that is it has a slight bent "U" shape because the bottom expands at a greater distance than the top of the vessel. The vessel support system of the present invention through load sensor 240 reacts to achieve a balanced system whereby the load on the various cables are minimized and/or the cable length is increased or decreased so that the geometric shape of the cylindrical vessel bottom, while not being exactly linear, typically is modestly bent toward its natural original shape so that essentially an even flow rate of a semi-molten waste material as well as the melted waste material therein is maintained. Also, the one or more trolleys, individually and separately, can move on rail 230 either forward along the feed direction (longitudinal) of vessel 300, or backward thereto to generally maintain the cable in a vertical position and to achieve and/or maintain a natural, approximate, linear shape of the vessel such as the bottom thereof. For example, the loads on the various individual cables, individually and operatively, often are greater at the vessel feed entrance since generally only a small portion of the waste material has evaporated. Movement of the trolleys can thus further adjust the load on the cables located at the feed entrance to provide a more linear flow of the waste material as well as an even flow rate thereof. Thus, efficient thermal and chemical conversion of the waste material are obtained.

However, in some instances, a general balanced load of all of the cables cannot be obtained. For example, due to influx of the waste feed stream 410 into vessel 300 at one end thereof, the tensions on said cables tend to be higher. In this situation the number of suspension cables 210 can, and should be, increased so that the additional load upon any given area of cables in vessel tank 300 is equally supported by the original as well as the additional cables in said any given area. That is, the load (i.e. weight) on each of the cables, as in the waste feed stream area 425, desirably is substantially the same. By the term "substantially", it is meant that the difference between a cable having a highest tension thereon or the lowest tension thereon is within about 20 or about 10 or desirably within about 5 wt. % of a preferred average cable tension supporting said vessel.

Plastic conversion vessel 300 can generally be any chemical vessel known to the art and to the literature, such as a pyrolytic vessel that is essentially free of oxygen as contained in air. That is, the amount of any oxygen within the free volume of vessel 300 is generally less than 3% by volume, desirably less than about 2% by volume, preferably at least 1% by volume, and very preferred, nil, that is free of any air or oxygen. Free volume is defined by the vapor space within vessel 300 other than the molten mass of waste material therein. A preferred plastic conversion vessel is set forth in U.S. Pat. No. 10,711,202, granted to RES Polyflow LLC and is hereby fully incorporated by reference including all aspects thereof. However, it is to be understood that many other types of vessels can exist.

Vessel 300 contains shroud 360 that is located substantially around the entire circumference of vessel 300. A plurality of inner walls 365 connect shroud 360 of vessel 300 and form heating zones and/or reaction zones within the vessel. Heat is supplied to the vessel via standard or conventional heating units 370 that generally exist within each section of the vessel that is separated by inner wall 365. The heat thus generally travels around the circumference of the generally cylindrical vessel 300 and exits therefrom through heat exhaust channels (not shown) at the top of the vessel. The heat in the different sections of vessel 300 generally volatize waste material 425 with the gases generated therefrom egressing from the vessel through product exhaust channels, not shown, where they are fed to a condensation unit, not shown, form many different types of products. Preferred products include various types of petroleum products such as naphtha, distillate such as diesel, jet fuel, gas oil such as heavy oil, wax, catalytic cracker feed, steam cracker feed, and the like.

A preferred thermal and chemical conversion vessel 300 contains a feedstock that comprises one or more plastic polymers, or hydrocarbonaceous waste materials 425, or any combination thereof. Such waste material can generally be in any shape or form such as pellets, shredded material, and the like. Waste material 425 is obtained from many sources such as plastic bottles, containers, sheeting, furniture, bags, polymer scrap and the like. Such waste material is fed via waste feed stream 410 to vessel input 320 and subsequently heated to cause various chemical reaction including pyrolytic reactions. As set forth in U.S. Pat. No. 10,711,202, the vessel has different heating zones that serve to propagate many reactions such as cracking, recombination, reforming, recracking, and the like, and form aliphatic and aromatic compounds. The vessel is generally heated as by hot air, steam, radiant heat, oil, or electric heat to high temperatures so that a substantial amount of chemical compounds thermally or chemically converted are in the form of a gas that exits the vessel through one or a plurality of product exhaust vents, such as one vent in each heating zone, not shown. Since the waste material fed to vessel 300, via waste transfer device 430, often contains inert matter such as various fillers, pigments, reinforcement materials, clay, silica, alumina, talc, glass, and the like, they generally remain within vessel 300 and by the means of helical screw 440 located within the vessel are removed through vessel discharge unit 330.

Desirably, as noted, the waste stream fed to vessel 300 can be one or more polymers, and/or hydrocarbonaceous material. Examples of preferred waste material polymers that essentially contain only hydrogen and carbon atoms include polyethylene, high density polyethylene, low density polyethylene, linear low density polyethylene, polypropylene, polybutylene, polystyrene, and the like. Other suitable commercial polymers include polyesters, polyvinylchlorides, polycarbonates, polymethyl methacrylates, nylons, acrylonitrile-butadiene-styrene (ABS) copolymers, polyurethanes, polyethers, poly(oxides), poly(sulfides), polyarylates, polyetherketones, polyetherimides, polysulfones, polyvinyl alcohols; and polymers formed by polymerization of dienes, vinyl esters, acrylates, acrylonitrile, methacrylates, methacrylonitrile, diacids, dials, or lactones, or any combination thereof. Still other polymers include block copolymers of the preceding, and alloys thereof. Polymer materials can also include thermoset polymers such as, for example, epoxy resins, phenolic resins, melamine resins, alkyd resins, vinyl ester resins, crosslinked polyester resins, crosslinked polyurethanes; and also crosslinked elastomers, including but not limited to, polyisoprene, polybutadiene, styrene-butadiene, styrene-isoprene, ethylene-propylene-diene, and blends thereof.

Examples of hydrocarbonaceous materials include various bitumens including bitumen tailings as from a mine, various heavy fractions of a fractionating column that include various heavy oils, greases, semi-asphalt compounds, and the like that by the present invention, are reduced to lighter components, and are mostly various types of hydrocarbon-containing gases.

Biopolymers, that is biomaterials that are sustainable, carbon neutral or renewable because they are made from plant materials which can be grown indefinitely, are not utilized. Examples of such biopolymers include, but are not limited to, polylactic acid (PLA) and polyhydroxyalkanoate (PHA) that are used in multi-layer sheet for food packaging applications, agricultural films, industrial equipment wrapping films and the like. Other biopolymers include polybutylene succinate-co-adipate (PBSA), polybutylene sebacate-co-terephthalate (PBST), and polybutylene adipate-co-terephthalate (PBAT). Still other examples of biopolymers include rubber, suberin, melanin and lignin. If utilized, the feedstock in the reactor at any given point in time based upon the weight of the biopolymer and the feedstock, is essentially free thereof. That is, generally is less than about 5 wt. %, desirably less than about 3 wt. %, and preferably, nil, that is no amount of biopolymer, in said feedstock.

With respect to start up or initiation of vessel 300 to pyrolyze plastic or hydrocarbonaceous waste materials, the vessel is heated and since, as noted above, the bottom portion thereof and generally the central bottom portion thereof expands more than other portions of the vessel, the vessel will deform. The same introduces added stress on the suspension cables located in the vicinity of the deformed central vessel portion. In order to compensate for the same, sensors or load cells 240 of the stressed suspension cables will record an increase in the stress above a normal load and send a message to a computer. Upon sensing higher stress on the noted suspension cables, a control device such as a computer (not shown) will send a signal to trolley 220 to reduce the air pressure in air bag 226 thereby causing cable tension adjustment device 224 to reduce the load thereon as by increasing the distance to the vessel. The combined load cells of the support system will also provide a precise weight of the vessel so that the accumulation of material or excess material fed to the vessel can be continuously monitored.

When needed, for example when excess waste material is added, the feed rate can be adjusted, as by reducing or increasing the same to maintain a desired weight of material within the vessel. The response to these and to other situations result in generally a balanced load on the various suspension cables such that the rate of waste material equilibrates to a steady state condition with only slight variation therefrom. In other words, a smooth, generally even, and efficient transfer of waste material 425 is achieved as it progressed through vessel 300. The result is a maximum efficiency of the use of the vessel with regard to converting waste material to suitable end use products such as naphtha, gas oil, diesel fuels, and the like that are produced and the problem of proper disposal of such waste material is improved whereby reduced ecological harm to planet Earth is achieved.

The above noted aspects of the present invention in providing minimized stress on the vessel as well as generally balanced loads on each of the cables serve to prevent excess loading on various lateral portions of the vessel that cause failure and even breakage thereof. The managed loading applied to the individual suspension cables 210 also serve to prevent undue accumulation of waste material at different portions within the vessel that can adversely affect the production of desired and/or amounts of specific gases therefrom.

While in accordance with the patent statutes, the best mode and preferred embodiment have been set forth, the scope of the invention is not limited thereto, but rather by the scope of the attached claims.

What is claimed is:

1. A support structure for selectively supporting a vessel, comprising:
    an overhead frame located above said vessel;
    a plurality of suspension cables; and
    a plurality of trolley devices attached to said overhead frame so that they are longitudinally movable along a length of the overhead frame, each of said plurality of trolley devices, independently, operatively, and movably securing a different one of said suspension cables to said overhead frame; at least some of said plurality of said suspension cables being operatively and independently connected to said vessel at various longitudinal locations thereon; and said plurality of trolley devices being capable of independently increasing or decreasing tension on said individual cables.

2. The support structure of claim 1, wherein said plurality of trolley devices comprise a cable tension adjustment device that increases or decreases said tension on said one or more cables.

3. The support structure of claim 2, wherein for any given area of said vessel, an additional amount of one or more suspension cables is contained so that the approximate tension on the individual cables in said given area is substantially the same.

4. The support structure of claim 1, wherein said tension on said one or more individual cables, independently can be increased or decreased by a turnbuckle.

5. A support structure for selectively supporting a vessel, comprising:
    an overhead frame located above said vessel;
    a plurality of suspension cables; and
    one or more trolley devices attached to said overhead frame, said one or more trolley devices, independently, operatively, and movably securing said suspension cables to said overhead frame; at least some of said plurality of said suspension cables being operatively connected to said vessel at various longitudinal locations thereon; and said one or more trolley devices being capable of independently increasing or decreasing tension on said individual cables,
    wherein said one or more trolley devices comprise a cable tension adjustment device that increases or decreases tension on said one or more cables, and
    wherein said cable tension adjustment device comprises an air bag having compressed air therein, wherein increased pressure in said air bag increases the tension on a suspension cable to which it is connected and wherein decreased pressure in said air bag decreases tension on a suspension cable to which it is connected.

6. The support structure of claim 5, wherein said support structure additionally comprises one or more load cells, each said load cell being capable of determining the load on an individual cable and wherein the load on each cable is substantially the same.

7. The support structure of claim 6, wherein each said one or more load cells is in communication with a control device that calculates the total load on said vessel.

8. The support structure of claim 7, wherein said control device is capable of sending a signal to an individual trolley to increase or decrease the pressure in said air bag to, respectively, increase or decrease the tension of said individual suspension cable.

9. The support structure of claim 8, wherein said cable tension adjustment device comprises an internal lower box that has a lower end and a top end, and wherein an air bag is located there between.

10. The support structure of claim 7, wherein for any given area of said vessel, an additional amount of one or more suspension cable is contained so that the approximate tension on the individual cables in said given area is substantially the same.

11. The support structure claim 7, wherein said tension on said plurality of substantially all of said cables is substantially the same.

12. The support structure of claim 5, wherein said vessel comprises a pyrolytic reactor.

13. The support structure of claim 5, wherein said cable tension adjustment device comprises an internal lower box that has a lower end and a top end, and wherein an air bag is located there between.

14. A support structure for selectively supporting a vessel, comprising:
    an overhead frame located above said vessel;
    a plurality of suspension cables; and
    one or more trolley devices attached to a lower side of said overhead frame and longitudinally movable along the overhead frame, said one or more trolley devices, independently, operatively, and movably securing said suspension cables to said overhead frame; at least some of said plurality of said suspension cables being operatively connected to said vessel at various longitudinal locations thereon; and said one or more trolley devices being capable of independently increasing or decreasing tension on said individual cables,
    wherein said vessel comprises a plastic feedstock conversion vessel.

15. A process for supporting a vessel from an overhead frame, comprising the steps of:
    adding a plurality of trolley devices independently to different longitudinal locations on said overhead frame, wherein the plurality of trolley devices are longitudinally moveable along the overhead frame;

a plurality of suspension cables, wherein each said suspension cable independently is connected to a different one of said trolley devices;

operatively connecting said one or more suspension cables each, independently, to a different longitudinal location on said vessel; and at least one cable tension adjustment device that increases or decreases the tension, on an individual suspension cable.

16. A process for supporting a vessel from an overhead frame, comprising the steps of:

adding a plurality of trolley devices independently to different longitudinal locations on said overhead frame;

a plurality of suspension cables, wherein each said suspension cable independently is connected to a different said trolley;

operatively connecting said one or more suspension cables each, independently, to a different longitudinal location on said vessel, and at least one cable tension adjustment device that increases or decreases tension, on an individual suspension cable, wherein said cable tension adjustment device, comprises an air bag having compressed air therein, wherein increased pressure in said air bag increases the tension on a suspension cable to which it is connected and wherein decreased pressure in said air bag decreases tension on a suspension cable to which it is connected.

17. The process of claim 16, wherein said cable tension adjustment device, comprises one or more load cells, each said load cell being capable of determining the load on an individual cable and wherein the load on each cable is substantially the same.

18. A process from claim 17, wherein each of said one or more load cells, independently, is in communication with a control device that calculates the total load on said vessel.

19. The process from claim 18, wherein said control device is a computer.

20. The process from claim 19, wherein for any given area of said vessel, an additional amount of one or more suspension cables is contained so that the approximate tension on the individual cables in said given area is substantially the same.

* * * * *